US012167051B2

(12) United States Patent
Strein et al.

(10) Patent No.: US 12,167,051 B2
(45) Date of Patent: Dec. 10, 2024

(54) RECALL AND TRIGGERING SYSTEM FOR CONTROL OF ON-AIR CONTENT AT REMOTE LOCATIONS

(71) Applicant: Disney Enterprises, Inc., Burbank, CA (US)

(72) Inventors: Michael Strein, New York, NY (US); David Teeter, New York, NY (US); Frank Zimmerlich, Hauppauge, NY (US); Anil Abraham, Nutley, NJ (US); Renford Beckford, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 69 days.

(21) Appl. No.: 16/536,932

(22) Filed: Aug. 9, 2019

(65) Prior Publication Data

US 2019/0364307 A1 Nov. 28, 2019

Related U.S. Application Data

(63) Continuation of application No. 14/338,149, filed on Jul. 22, 2014, now Pat. No. 10,432,986.
(Continued)

(51) Int. Cl.
*H04N 21/234* (2011.01)
*G06F 16/70* (2019.01)
*H04N 21/2187* (2011.01)
*H04N 21/235* (2011.01)
*H04N 21/643* (2011.01)
*H04N 21/81* (2011.01)

(52) U.S. Cl.
CPC ....... *H04N 21/23424* (2013.01); *G06F 16/70* (2019.01); *H04N 21/2187* (2013.01); *H04N 21/235* (2013.01); *H04N 21/64322* (2013.01); *H04N 21/814* (2013.01); *H04N 21/8146* (2013.01)

(58) Field of Classification Search
CPC ...................... H04N 21/23424; H04N 21/814
See application file for complete search history.

(56) References Cited

U.S. PATENT DOCUMENTS

8,752,113 B1 * 6/2014 Good ................... H04L 65/762
725/115
2002/0057286 A1 * 5/2002 Markel ............. H04N 21/6377
715/704
(Continued)

*Primary Examiner* — Frank Johnson
(74) *Attorney, Agent, or Firm* — Farjami & Farjami LLP (57) ABSTRACT

There is provided a recall and triggering system and method for the control of on-air graphics at remote locations. The system including a television network and an affiliated station, the television network configured to insert a command into a video and transmit the video including the command to the affiliated station, and the affiliated station configured to receive the video including the command from the television network, store the video in the memory, detect the command from the video stored in the memory, retrieve the data from a database based on the command, modify the video using the data to generate a modified video, and transmit the modified video to a display device. The database may be stored in the memory of the affiliated station or on a separate server. The data may include graphics, content, databases, spreadsheets, tables, websites, news, or other graphical content.

20 Claims, 5 Drawing Sheets

Related U.S. Application Data (60) Provisional application No. 62/005,232, filed on May 30, 2014.

(56) References Cited

U.S. PATENT DOCUMENTS

| | | | | |
|---|---|---|---|---|
| 2006/0130111 A1* | 6/2006 | Reitmeier | H04H 20/103 | 725/112 |
| 2008/0195938 A1* | 8/2008 | Tischer | H04N 21/25891 | 715/255 |
| 2009/0165035 A1* | 6/2009 | Sandoval | H04N 21/812 | 725/32 |
| 2009/0175358 A1* | 7/2009 | Gordon | H04N 21/631 | 375/E7.2 |
| 2010/0037253 A1* | 2/2010 | Sheehan | H04H 20/103 | 725/31 |
| 2010/0138478 A1* | 6/2010 | Meng | H04N 21/47 | 725/109 |
| 2010/0138858 A1* | 6/2010 | Velazquez | H04N 21/435 | 725/33 |
| 2010/0180296 A1* | 7/2010 | Hendricks | H04N 21/2543 | 725/34 |
| 2011/0016487 A1* | 1/2011 | Chalozin | H04N 21/258 | 725/35 |
| 2011/0141245 A1* | 6/2011 | Jang | H04N 21/431 | 348/51 |
| 2012/0002946 A1* | 1/2012 | Antonellis | H04N 21/4884 | 386/E5.009 |
| 2012/0060095 A1* | 3/2012 | Klappert | H04N 21/458 | 707/E17.03 |
| 2012/0210369 A1* | 8/2012 | Sakhartov | H04N 21/8583 | 725/60 |
| 2013/0031582 A1* | 1/2013 | Tinsman | H04N 21/4316 | 725/36 |
| 2013/0332463 A1* | 12/2013 | Roberts | G06F 16/4393 | 707/741 |
| 2014/0068466 A1* | 3/2014 | Garcia | H04L 61/6022 | 715/756 |

* cited by examiner

RECALL AND TRIGGERING SYSTEM FOR CONTROL OF ON-AIR CONTENT AT REMOTE LOCATIONS

RELATED APPLICATIONS

The present application is a Continuation of U.S. application Ser. No. 14/338,149, filed Jul. 22, 2014, which claims the benefit of and priority to a U.S. Provisional Patent Application Ser. No. 62/005,232, filed May 30, 2014, and titled "Recall and Triggering System for Control of On-Air Graphics at Remote Locations," which is hereby incorporated by reference in its entirety into the present application.

BACKGROUND

In broadcasting television channels, a television network provides the scheduled programming to at least one affiliated station so that the affiliated station can broadcast the programming to the houses of consumers. When providing the scheduled programming to the affiliated stations, a television network follows many standard protocols. As such, it would be helpful to the television network if the television network were able to use the standard protocols to add content and graphics to the programming after the programming has been provided to the affiliated stations. For example, it would be helpful if a television network were able to call and insert local content and graphics into a video using the standard protocol systems for video signals after the video has been provided to the affiliated stations.

SUMMARY

The present disclosure is directed to a recall and triggering system for the control of on-air content at remote locations, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
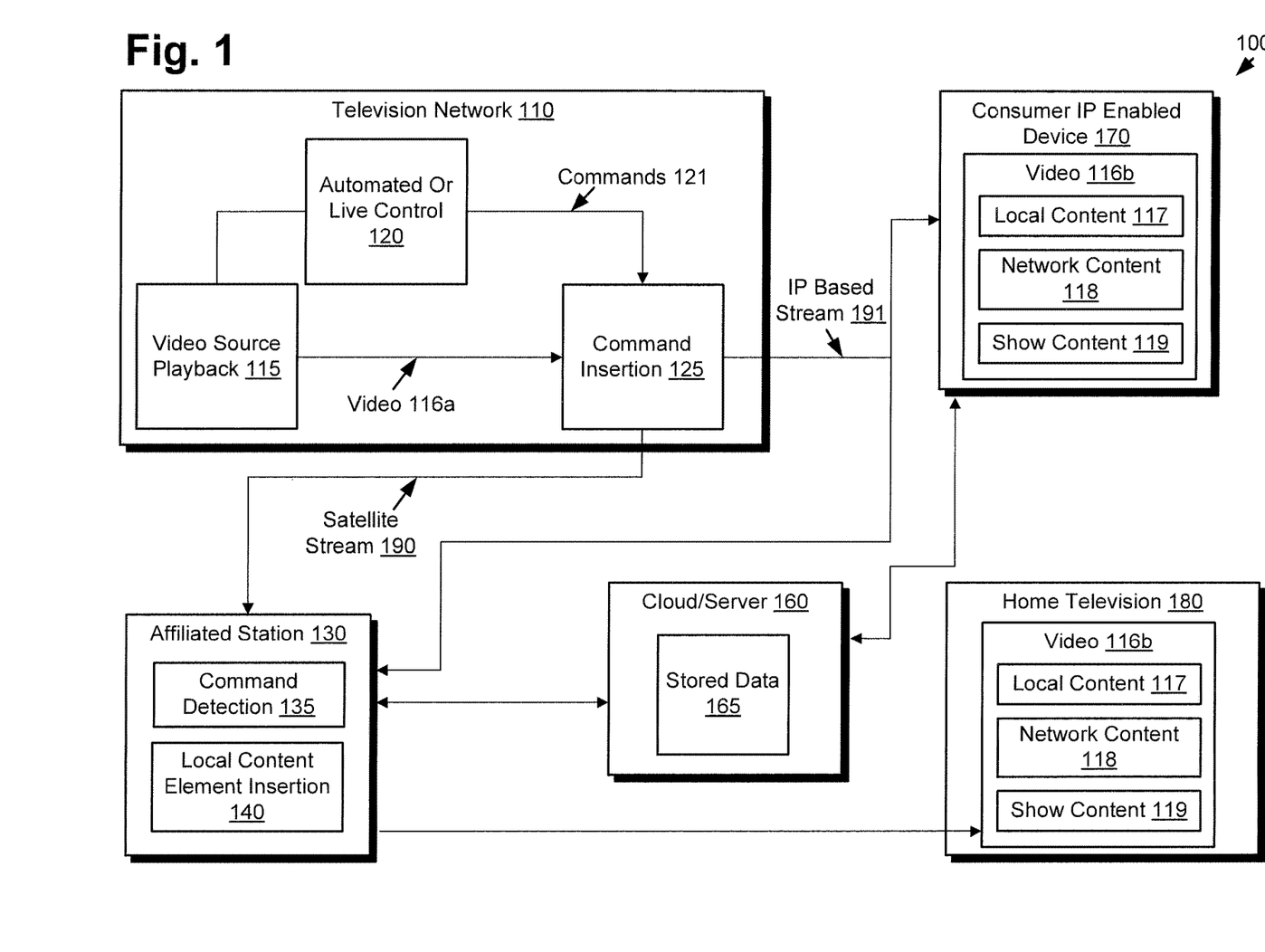
FIG. 1 presents a recall and triggering system for the control of on-air content at remote locations, according to one implementation of the present disclosure.

FIG. 1 presents a recall and triggering system for the control of on-air content at remote locations, according to one implementation of the present disclosure. Recall and triggering system 100 of FIG. 1 includes television network 110, affiliated station 130, cloud/server 160, consumer Internet Protocol (IP) device 170, and home television 180. Television network 110 includes video source playback 115, video 116a, automated or live control 120, commands 121, and command insertion 125. Affiliated station 130 includes command detection 135 and local content element insertion 140. Cloud/Server 160 includes stored data 165. Consumer IP enabled device 170 includes video 116b, which includes local content 117, network content 118, and show content 119. Home television 180 includes video 116b, which includes local content 117, network content 118, and show content 119. Also illustrated in FIG. 1 are satellite stream 190 and IP based stream 191.

As illustrated in FIG. 1, command insertion 125 of television network 110 inserts commands 121 provided by automated or live control 120 into video 116a provided by video source playback 115. Video source playback 115 may include a database of stored videos that will be transmitted from television network 110 to affiliated stations, such as affiliated station 130. The videos from video source playback 115 may include, but are not limited to, a creative media work or project, such as a video clip, a full-length movie or animation, an episode of a drama or television series, a live or recorded sporting event, live or recorded news programs, or any other type of audiovisual work or content that is provided by television networks.

Automated or live control 120 may be used by television network 110 to generate commands that are to be inserted into videos provided by video playback source 115, and/or automated or live control 120 may include a database of stored commands that are to be inserted into videos provided by video playback source 115. The commands generated and provided by automated or live control 120 may correspond to single operation messages or multiple operation messages. For example, the commands may be generated using Society of Cable Television Engineers (SCTE) standards, such as SCTE 104.

Commands 121 may be used to make calls to databases for local data that is to be inserted into video 116a by affiliated station 130. The local data may include, but is not limited to, graphics, content elements, news, websites, emergency information, spreadsheets, tables, or any other data that can be inserted in videos. For example, commands 121 may include calls to databases which contain data and/or content elements related to a template, calls to spreadsheets which contain data and/or graphics related to a template, calls to tables which contain data and/or content elements related to a template, or calls to other internal or external data and/or content elements, which will be explained in greater detail with regard to FIG. 3.

After receiving both video 116a from video source playback 115 and commands 121 from automated or live control 120, command insertion 125 inserts commands 121 into video 116a. For example, command insertion 125 may insert commands 121 into video 116a using the Data Identifier (DID) and Secondary Data Identifier (SDID) as defined by the Society of Motion Picture and Television Engineers (SMPTE). As such, commands 121 may be carried in the vertical ancillary data (VANC) area of the video signal of video 116a.

It should be noted that while these commands are designed to use standard protocols for definition and carriage, the carriage mechanisms need not be limited to the video streams as discussed above. For example, carriage can be in compressed video transport streams using compressed standards such as Moving Picture Experts Group (MPEG), Joint Photographic Experts Group (JPEG), or any other varieties of compressed video standards. Furthermore, the carriage can be streaming in IP signals, uncompressed or compressed, using a variety of the methods discussed above. When carried in compressed streams, the SCTE 104 protocol messages will be converted to SCTE 35 Digital Program Insertion Messages.

It should further be noted that commands 121 do not have to be inserted into a real-time stream. For example, commands 121 may be inserted, using the same methods and protocols described above, into video files, such as when the files are played out commands 121 will be present at their specific locations. These are applications in a file based delivery system where files are sent from television network 110 to affiliated station 130 instead of real-time transmission.

Also illustrated in FIG. 1, after inserting commands 121 into video 116a, television network 110 transmits video 116a including commands 121 to affiliated station 130. Television network 110 may transmit video 116a including commands 121 to affiliated station 130 using any wired or wireless technology, such as, but not limited, a satellite transmission, Wireless Fidelity (Wi-Fi), Worldwide Interoperability for Microwave Access (WiMax), ZigBee, Bluetooth, Bluetooth low energy, Algorithm Division Multiple Access (CDMA), Evolution-Data Optimized (EV-DO), Global System for Mobile Communications (GSM), Long Term Evolution (LTE). For example, and as illustrated in FIG. 1, television network 110 may transmit video 116a including commands 121 to affiliated station 130 using satellite stream 190 or IP based stream 191.

After receiving video 116a including commands 121 from television network 110, affiliated station 130 utilizes command detection 135 and local content elements insertion 140 to insert the local data into video 116a based on commands 121. Command detection 135 is used by affiliated station 130 to search through video 116a to detect commands 121. After detecting commands 121, local content elements insertion 140 call and inserts the local data into video 116a, as will be described in more detail with regard to FIG. 3. In one implementation, affiliated station 130 may include a database with the local data that will be inserted into video 116a. Furthermore, in another implementation, affiliated station 130 may further utilize an external database to retrieve the local data for insertion into video 116a. For example, in such an implementation, affiliated station 130 may retrieve the local data from stored data 165 of cloud/server 160.

Also illustrated in FIG. 1, affiliated station 130 transmits video 116b to home television 180. Home television 180 may include any electronic device that includes a display for playing videos, such as video 116b. As such, home television 180 may include, but is not limited to, a television, a computer, a mobile phone, or a tablet. In one implementation, affiliated station 130 may transmit video 116b to home television using any wired or wireless technology, as described above. However, in another implementation, affiliated station 130 may transmit video 116b to a separate device (not shown) that is connected to and used by home television 180 to view video 116b.

Video 116b corresponds to video 116a except that affiliated station 130 has inserted the local data into video 116a to generate video 116b. As such, video 116b includes local content 117, network content 118, and show content 119. Local content 117 may include all of the local data and/or graphics inserted into video 116b by affiliated station 130 based on commands 121, as will be explained in greater detail with regard to FIG. 3. Network content 118 may include any data and/or graphics that were inserted into video 116b by television network 110. Finally, show content 119 may include any data and/or graphics from the original show that video 116b corresponds to before any local content 117 or network content 118 were inserted.

Also illustrated in FIG. 1, television network 110 may further transmit video 116a including commands 121 to consumer IP enabled device 170. Consumer enabled IP device 170 may include, but is not limited to, a computer, mobile phone, tablet, or any other device capable of receiving videos using wired or wireless technology. As such, television network 110 may transmit video 116a including commands 121 using any wired or wireless technology, as described above. For example, and as illustrated in FIG. 1, consumer IP enabled device 170 receives video 116a including commands 121 using IP based stream 191.

After receiving video 116a including commands 121 from television network 110, consumer IP enabled device 170 may detect commands 121 and insert local data into video 116a using similar methods as affiliated station 130 described above. For example, consumer IP enabled device 170 may retrieve the local data from stored data 165 of cloud/server 160 for insertion into video 116a. As illustrated in FIG. 1, video 116b of consumer IP enabled device 170 now includes local content 117, network content 118, and show content 119.

It should be noted that the implementation of FIG. 1 only illustrates one television network 110, one affiliated station 130, one cloud/server 160, one consumer IP enabled device 170, and one home television 180, however, the present disclosure is not limited to the implementation of FIG. 1. In other implementations, there may be any number of television networks, affiliated stations, cloud/servers, consumer IP enabled devices and home televisions. For example, television network 110 may be transmitting video 116a including commands 121 to multiple affiliated stations. In such an example, each of the affiliated stations may be transmitting video 116b to multiple home televisions.

Figure 2:
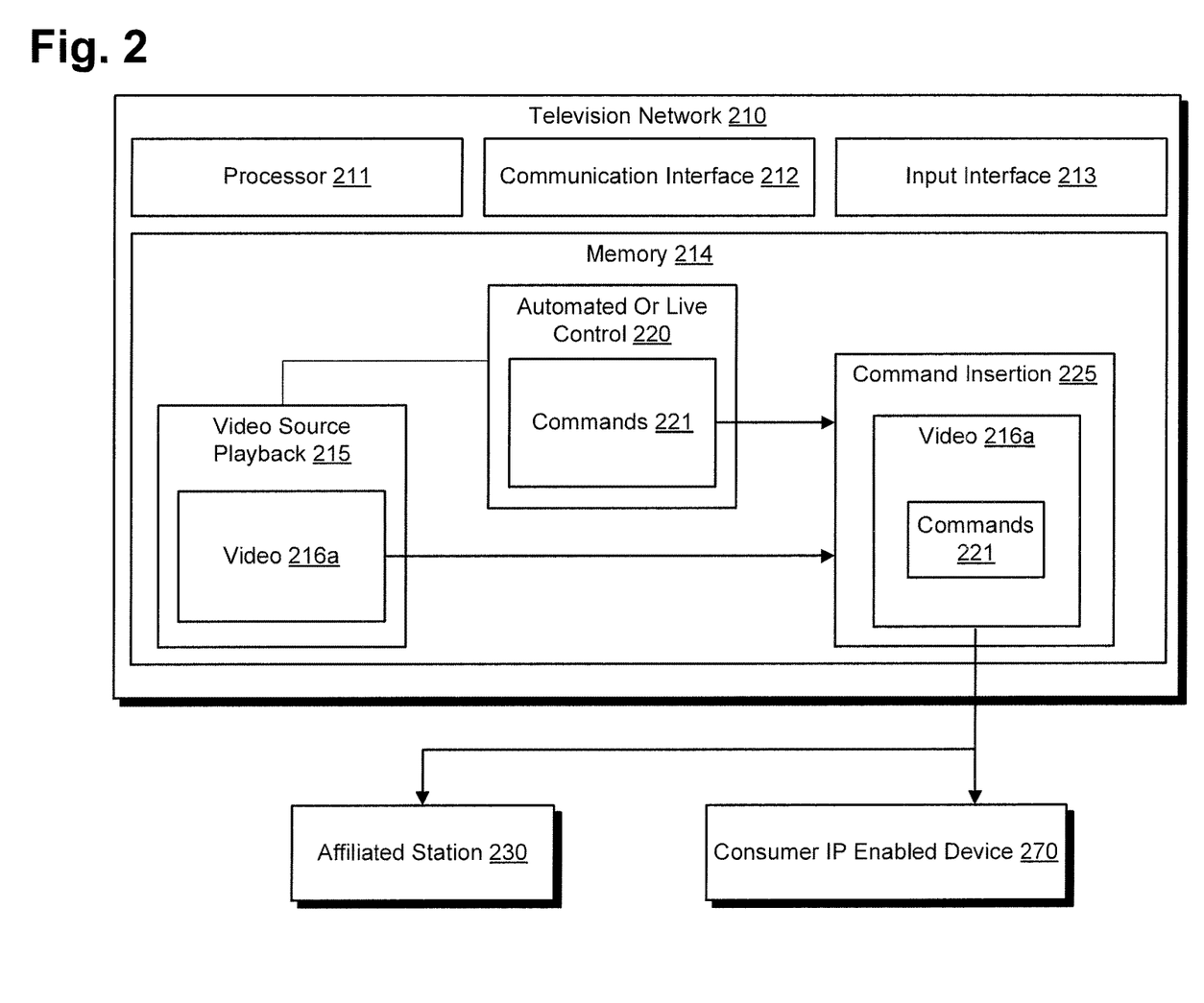
FIG. 2 presents an example of a television network used for the control of on-air content at remote locations, according to one implementation of the present disclosure.

FIG. 2 presents an example of a television network used for the control of on-air content at remote locations, according to one implementation of the present disclosure. FIG. 2 includes television network 210, affiliated station 230, and consumer IP enabled device 270. Television network 210 includes processor 211, communication interface 212, input interface 213, and memory 214. Memory 214 includes video source playback 215, automated or live control 220, and command insertion 225. Video source playback 215 includes video 216a. Automated or live control 220 includes commands 221. Command insertion 225 includes video 216a, which includes commands 221.

With regards to FIG. 2 it should be noted that television network 210, video source playback 215, video 216a, automated or live control 220, commands 221, command insertion 225, affiliated station 230, and consumer IP enabled device 270 correspond respectively to television network 110, video source playback 115, video 116a, automated or live control 120, commands 121, command insertion 125, affiliated station 130, and consumer IP enabled device 170. Furthermore, some features of have been left out of FIG. 2 for clarity purposes.

As illustrated in FIG. 2, television network 210 includes processor 211 and memory 214. Processor 211 may be configured to access memory 214 to store received input or to execute commands, processes, or programs stored in memory 214, such as command insertion 225. Processor 211 may correspond to a processing device, such as a microprocessor or similar hardware processing device, or a plurality of hardware devices. However, in other implementations processor 211 refers to a general processor capable of performing the functions required by television network 210. Memory 214 is capable of storing commands, processes, and programs for execution by processor 211. Memory 214 may be instituted as ROM, RAM, flash memory, or any sufficient memory capable of storing a set of commands. In other implementations, memory 214 may correspond to a plurality memory types or modules.

Also illustrated in FIG. 2, television network 210 includes input interface 213. Input interface 213 may comprise, for example, a keyboard, a mouse, a game controller, a touchscreen input, a thermal and/or electrical sensor, or any other device capable of accepting user input for use with television network 210. As such, a user may utilize input interface 213 to generate new commands 221 to be stored in automated or live control 220 of television network 210.

Also illustrated in FIG. 1, command insertion 225 of television network 210 inserts commands 221 received from automated or live control 220 into video 216a received from video source playback 215. As discussed above, command insertion 225 may insert command 221 into video 216a using the DID and SDID as defined by the SMPTE. As such, commands 221 may be carried in the VANC area of the video signal of video 216a. Commands 221 may include calling local data from a database and inserting the local data into video 216a, which will be discussed in detail with regard to FIG. 3.

Also illustrated in FIG. 1, after inserting commands 221 into video 216a, television network 210 may transmit video 216a including commands 221 to affiliated station 230 or consumer IP enabled device 270 using communication interface 212 As such, communication interface 212 may utilize any of the wired or wireless technologies described above to transmit video 216a including commands 221 to affiliated station 230 or consumer IP enabled device 270. For example, television network 210 may transmit video 216a including commands 221 to affiliated station 231 using a satellite transmission.

Figure 3:
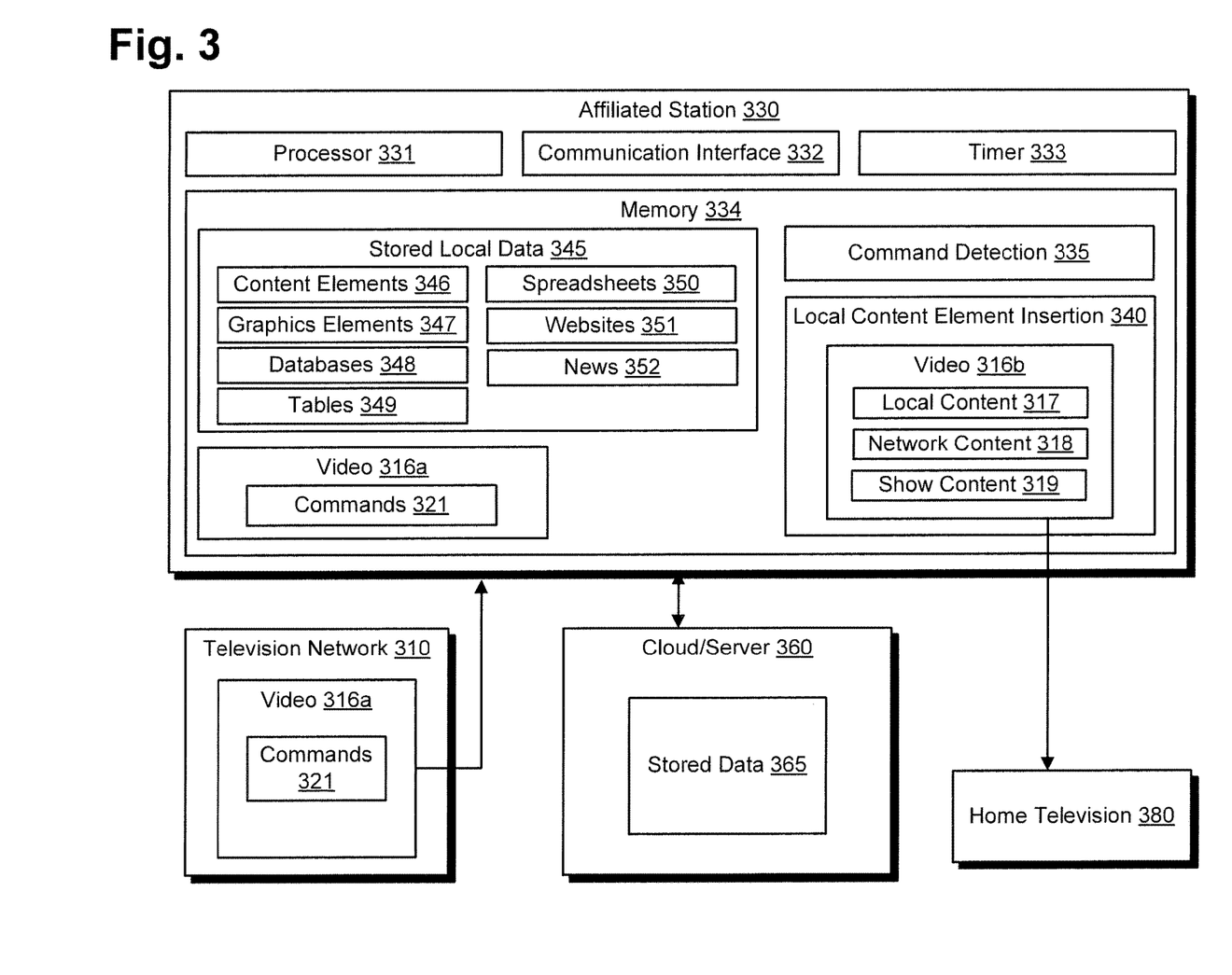
FIG. 3 presents an example of an affiliated station used for the control of on-air content at remote locations, according to one implementation of the present disclosure.

FIG. 3 presents an example of an affiliated station used for the control of on-air content at remote locations, according to one implementation of the present disclosure. FIG. 3 includes television network 310, affiliated station 330, cloud/server 360, and home television 380. Television network 310 includes video 316a, which includes commands 321. Affiliated station 330 includes processor 331, communication interface 332, timer 333, and memory 334. Memory 334 includes video 316a, command detection 335, local content element insertion 340, and stored local data 345. Local content element insertion 340 includes video 316b, which includes local content 317, network content 318, and show content 319. Stored local data 345 includes content elements 346, graphics elements 347, databases 348, tables 349, spreadsheets 350, websites 351, and news 352. Cloud/Server 360 includes stored data 365.

With regard to FIG. 3, it should be noted that television network 310, video 316a, local content 317, network content 318, show content 319, commands 321, affiliated station 330, command detection 335, local content element insertion 340, cloud/server 360, stored data 365, and home television 380 correspond respectively to television network 110, video 116a, local graphics 117, network content 118, show content 119, commands 121, affiliated station 130, command detection 135, local content element insertion 140, cloud/server 160, stored data 165, and home television 180 from FIG. 1. Furthermore, television network 310, video 316a, commands 321, and affiliated station 330 from FIG. 3 correspond respectively to television network 210, video 216a, commands 221, and affiliated station 230 from FIG. 2.

As illustrated in FIG. 3, affiliated station 330 includes processor 331 and memory 334. Processor 331 may be configured to access memory 334 to store received input or to execute commands, processes, or programs stored in memory 334, such as command detection 335 and local content element insertion 340. Processor 331 may correspond to a processing device, such as a microprocessor or similar hardware processing device, or a plurality of hardware devices. However, in other implementations processor 331 refers to a general processor capable of performing the functions required by affiliated station 330. Memory 334 is capable of storing commands, processes, and programs for execution by processor 331. Memory 334 may be instituted as ROM, RAM, flash memory, or any sufficient memory capable of storing a set of commands. In other implementations, memory 334 may correspond to a plurality memory types or modules.

Also illustrated in FIG. 3, television network 310 transmits video 316a including commands 321 to affiliated station 330 and affiliated station 330 stores video 316a including commands 321 in memory 334. Affiliated station 330 may receive video 316a including commands 321 using communication interface 332. Communication interface 332 may utilize any of the wired or wireless technologies described above. For example, affiliated station 330 may receive video 316a including commands 321 using a satellite transmission.

Also illustrated in FIG. 3, after storing video 316a including commands 321 in memory 334, affiliated station 330 utilizes command detection 335 to detect commands 321 from video 316a. Next, after detecting commands 321 from video 316a, affiliated station 330 utilizes local content element insertion 340 to call and insert local data into video 316a based on commands 321. For example, commands 321 may be utilized to initiate, but are not limited to, the following features for calling the local data.

Commands 321 may make calls databases 348 which may contain data and/or content elements 346 related to a template. Databases 348 can increment based on time or day to allow a much more topical and feature-rich graphical environment. Databases 348 also may increment based on other data, such as show type for video 316a or Television playout schedule for the day, week or month of video 316a. Databases 348 may be local to affiliated station 330 or remote from affiliated station 330, such as stored in stored data 365 on cloud/server 360.

Commands 321 may make calls to spreadsheets 350 which may contain data and/or graphics elements 347 related to a template. Spreadsheets 350 can increment based on time or day to allow a much more topical and feature-rich graphical environment. Spreadsheets 350 may also increment based on other data, such as show type for video 316a or Television playout schedule for the day, week or month of video 316a. Spreadsheets 350 may be local to affiliated station 330 or remote from affiliated station 330, such as stored in stored data 365 on cloud/server 360.

Commands 321 may make calls to any other type of table 349 which may contain data and/or content elements 346 related to a template. Tables 349 can increment based on time or day to allow a much more topical and feature-rich graphical environment. They also may increment based on other data, such as show type for video 316*a* or Television playout schedule for the day, week or month of video 316*a*. Tables 349 may be local to affiliated station 330 or remote from affiliated station 330, such as stored in stored data 365 on cloud/server 360.

Commands 321 may also load a database, spreadsheet or any other type of table into local content element insertion 340. These databases, spreadsheets or tables can be set to then increment independently, without the requirement for a start command from command insertion 125 from FIG. 1. Additionally, commands 321 can include a stop command to stop the loading of the database, spreadsheet or table.

Commands 321 may also be timed, based on local (affiliated station 330) time using timer 333, an external reference time local to affiliated station 330 or based on a time reference coming from cloud/server 360. Alternatively, the times may be relative, timed to the start of the template.

Commands 321 may make calls that are to be initiated to social media websites and allow specific, directed social inclusion in a template, such as to websites 351. This allows the templates to be modified. The social website data may also be filtered for display. For example, the social website data may be filtered for display when it includes poll data.

Commands 321 may make calls to external websites databases or internal/external reference locations that contain specific data to be used in a template, such as making calls to websites 351. For example, the specific data may include, but is not limited to, weather information, stock report information, time information, date information, or any other data that is made available by external websites, databases or internal/external reference locations.

Commands 321 may make calls to internal or external news services that contain specific data such as news headlines for the region, state, country or world, such as news 352. Furthermore, commands 321 may make calls to internal or external sports services that contain specific data such as sports scores, trade information, or other sporting news. Also, commands 321 may make calls to internal or external services that provide emergency information in terms of crisis, such as evacuation information, a severe weather warning, or other emergency information.

Commands 321 may make calls to have affiliated station 330 provide local content elements to IP based streams, that contain the same content as the originating video network program, that are requested from the same local geographic area as affiliated station 330. Geo-location is used to identify the origin of the stream request. The local content elements can be local to affiliated station 330 or in a local or remote data center.

Commands 321 may make calls to allow command detection 335 and local content element insertion 340 to act in an "image recognition" mode, meaning that content element recall and display can be initiated by the image recognition of certain specific parameters. Conversely, commands 321 may make calls to allow command detection 335 and local content element insertion 340 to remove content elements based on the image recognition.

It is noted that commands 321 are also not limited to recalling, addressing and populating templates. For example, video clips, audio clips, data clips or any other type of sequence may be referenced, loaded, called and/or played by commands 321. Additionally, any database, spreadsheet or table may reference, increment or deliver any type of clip and be called from commands. These clips may be local to affiliated station 330 or in a local or remote server, such as cloud/server 360. Clips can consist of commercials, promotions, public service announcements, programs, segments of programs, or any other type of programs that can be broadcast to a television.

It should further be noted that in one implementation, stored data 365 of cloud/server 360 may be similar to stored local data 345 of affiliated station 330. For example, in such an implementation, stored data 365 of cloud/server 360 may include content elements 356, graphics elements 347, databases 348, tables 349, spreadsheets 350, websites 351, and news 352. However, in other implementations, stored data 365 of cloud/server 360 may contain only some of the data stored of stored local data 345, or stored data 365 of cloud/server 360 may contain additional data not stored in stored local data 345.

Also illustrated in FIG. 3, local content element insertion 340 of affiliated station 330 includes video 316*b*. As discussed above, video 316*b* corresponds to video 316*a* except that affiliated station 330 has inserted the local data into video 316*a* to generate video 316*b*. For example, affiliated station 330 may have utilized local content element insertion 340 to insert local content 317 into video 316*a* to generate video 316*b*. In such an example, local content 317 may include any of the features discussed above that are initiated by commands 321.

It is noted that video 316*b* illustrates three types of content elements overlaid on video 316*b*, which include local content 317, network content 318, and show content 319. In one implementation, commands 321 may control the layering of local content 317, network content 318, and show content 319. For example, in such an implementation, the content elements can have three-dimensional information, which allows one of the content elements to take precedence and be layered over another of the content elements. Commands 321 can thus be used to control and change the layering of the content elements.

Also illustrated in FIG. 3, affiliated station 330 transmits video 316*b* to home television 380. For example, after affiliated station 330 has generated video 316*b* based on commands 321, affiliated station 330 may transmit video 316*b* to home television 380 using communication interface 332, where communication interface 332 utilizes any of the wired or wireless technologies described above. After receiving video 316*b* from affiliated station 330, home television 380 may display video 316*b* using a display.

Figure 4:
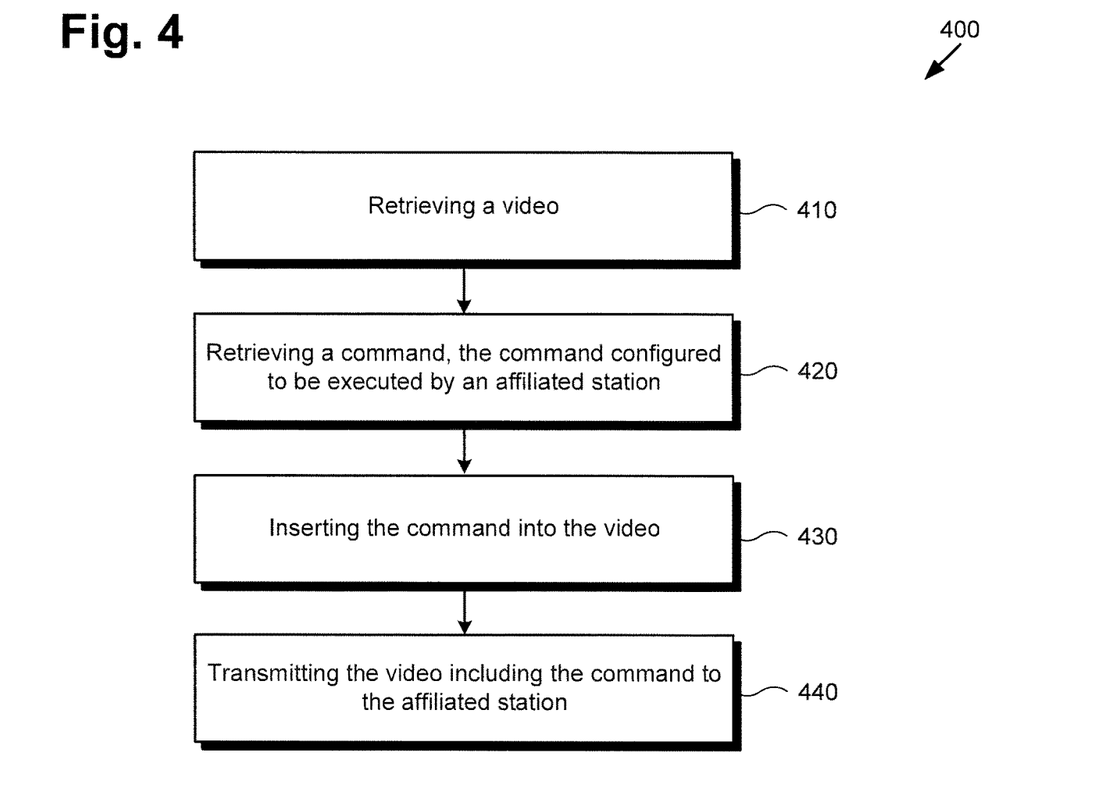
FIG. 4 presents flowchart illustrating a method for a television network to control the on-air content at remote locations, according to one implementation of the present disclosure.

FIG. 4 presents flowchart illustrating a method for a television network to control the on-air content at remote locations, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 2, the disclosed inventive concepts are not intended to be limited by specific features shown and described with respect to FIG. 2. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes retrieving a video (410). For example, processor 211 of television network 210 may retrieve video 216a from video source playback 215. As discussed above, video source playback 215 may include a database of stored videos that will be transmitted from television network 310 to affiliated station 330. The videos from video source playback 315 may include, but are not limited to, a creative media work or project, such as a video clip, a full-length movie or animation, an episode of a drama or television series, a live or recorded sporting event, a live or recorded news program, or any other type of audiovisual work or content.

Flowchart 400 also includes retrieving a command, the command configured to be executed by an affiliated station (420). For example, processor 211 of television network 210 may retrieve commands 221 from automated or live control 220, where commands 221 are configured to be executed by affiliated station 230. As discussed above, commands 221 generated and provided by automated or live control 220 may correspond to single operation messages or multiple operation messages. Commands 221 may be used to make calls to databases for local data that is to be inserted into video 216a by affiliated station 230.

Flowchart 400 also includes inserting the command into the video (430). For example, processor 211 of television network 210 may execute command insertion 225 to insert commands 221 into video 216a. As discussed above, command insertion 225 may insert commands 221 into video 216a using the DID and SDID as defined by SMPTE. As such, commands 221 may be carried in the VANC area of the video signal of video 216a. Flowchart 400 also includes transmitting the video including the command to the affiliated station (440). For example, processor 211 of television network 210 may transmit video 216a including commands 221 to affiliated station 230 using communication interface 212.

Figure 5:
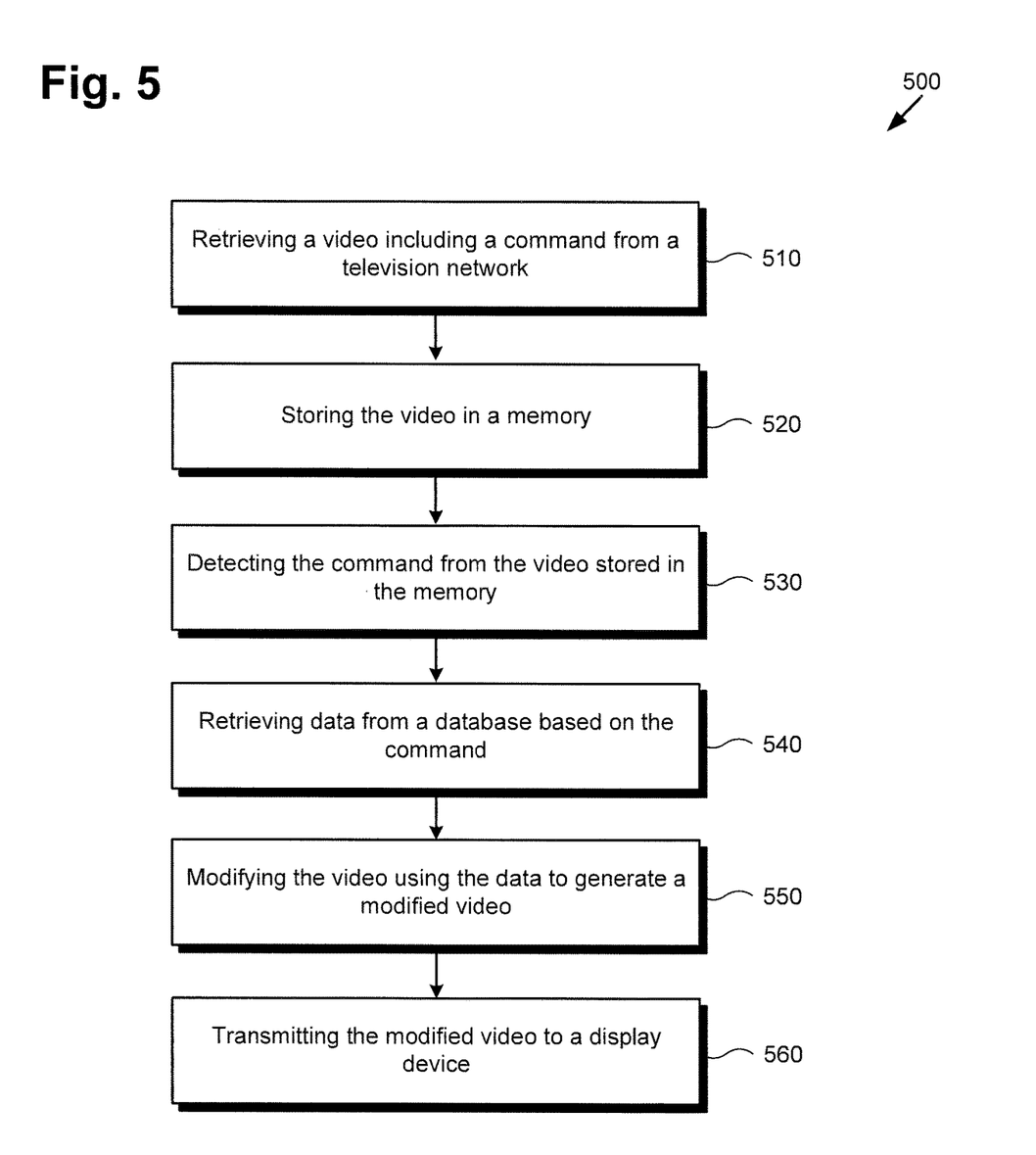
FIG. 5 shows a flowchart illustrating a method for an affiliated station to insert the on-air content at remote locations, according to one implementation of the present disclosure.

FIG. 5 shows a flowchart illustrating a method for an affiliated station to insert the on-air content at remote locations, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 3, the disclosed inventive concepts are not intended to be limited by specific features shown and described with respect to FIG. 3. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes receiving a video including a command from a television network (510) and storing the video in a memory (520). For example, processor 331 of affiliated station 330 may receive video 316a including commands 321 from television network 310 using communication interface 332. After receiving video 316a including commands 321 from television network 310, processor 331 of affiliated station 330 may then store video 316a in memory 334.

Flowchart 500 also includes detecting the command from the video stored in the memory (530) and retrieving data from a database based on the command (540). For example, processor 331 of affiliated station 330 may execute command detection 335 to detect commands 321 from video 316a stored in memory 334. After detecting commands 321 from video 316a, processor 331 of affiliated station 330 may execute local content element insertion 340 to retrieve data stored in a database. As discussed above, the database may be stored in memory 334 of affiliated station, such as stored local data 345, or the database may be external from affiliated station 330, such as stored data 365 of cloud/server 360. The data may include, but is not limited to, content elements 346, graphics elements 347, databases 348, tables 349, spreadsheets 350, websites 351, or news 352.

Flowchart 500 also includes modifying the video using the data to generate a modified video (550) and transmitting the modified video to a display device (560). For example, processor 331 of affiliated station 330 may execute local content element insertion 340 to modify video 316a using the data to generate video 316b. As discussed above, modifying video 316a may include inserting the data into video 316a as local content 317. After generating modified video 316b, processor 331 of affiliated station 330 may transmit video 316 to home television 380.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in faun and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An affiliated entity for communication with a content providing network, the affiliated entity comprising:
    a memory storing a command detection program and a local content element insertion program; and
    a processor configured to:
        receive an Internet-protocol-based (IP-based) stream carrying a video from the content providing network, the video including: (1) video content, (2) a plurality of commands inserted into the video by the content providing network for use by the affiliated entity, the plurality of commands including a first command to change a layering precedence, and (3) network content inserted by the content providing network into the video;
        detect the plurality of commands in the video being carried by the IP-based stream;
        load, based on a second command of the plurality of commands, a database into the local content element insertion program;
        retrieve, based on the second command, local content from the database loaded into the local content element insertion program;
        modify, based on the first command, the video using the local content to generate a modified video, wherein the first command changes the layering precedence of the local content, the network content, and the video content with respect to one another during the modifying according to three-dimensional information carried by the local content and at least one of the network content or the video content, wherein the three-dimensional information is used to change the layering precedence of the local content; and
        transmit the modified video to a display.

2. The affiliated entity of claim 1, wherein the database comprises a remotely stored database.

3. The affiliated entity of claim 1, wherein the local content includes a graphic, and wherein the processor is configured to generate the modified video by overlaying the graphic on the video.

4. The affiliated entity of claim 1, wherein the processor is configured to retrieve the local content from the database further based on a type of the video.

5. The affiliated entity of claim 1, wherein the processor is further configured to:
obtain social media website data from a social media website based on the first command; and
modify the modified video using the social media website data before transmitting the modified video to the display.

6. The affiliated entity of claim 1, wherein the local content includes emergency information, and wherein the processor is configured to generate the modified video by overlaying the emergency information on the video.

7. The affiliated entity of claim 1, wherein the local content includes news, and wherein the processor is configured to generate the modified video by overlaying the news on the video.

8. The affiliated entity of claim 1, wherein the plurality of commands are inserted into the video in real-time while streaming the video using the IP-based stream.

9. The affiliated entity of claim 1, wherein the content providing network is a television network.

10. The affiliated entity of claim 1, wherein the second command is used to make a call to the database to retrieve the local content from the database.

11. A method for use by an affiliated entity in communication with a content providing network, the affiliated entity including a memory storing a command detection program and a local content element insertion program, the method comprising:
receiving an Internet-protocol-based (IP-based) stream carrying a video from the content providing network, the video including: (1) video content, (2) a plurality of commands inserted into the video by the content providing network for use by the affiliated entity, the plurality of commands including a first command to change a layering precedence, and (3) network content inserted by the content providing network into the video;
detecting the plurality of commands in the video being carried by the IP-based stream;
loading, based on a second command of the plurality of commands, a database into the local content element insertion program;
retrieving, based on the second command, local content from the database loaded into the local content element insertion program;
modifying, based on the first command, the video using the local content to generate a modified video, wherein the first command changes the layering precedence of the local content, the network content, and the video content with respect to one another during the modifying according to three-dimensional information carried by the local content and at least one of the network content or the video content, wherein the three-dimensional information is used to change the layering precedence of the local content; and
transmitting the modified video to a display.

12. The method of claim 11, wherein the database comprises a remotely stored database.

13. The method of claim 11, wherein the local content includes a graphic, and wherein modifying the video to generate the modified video comprises overlaying the graphic on the video.

14. The method of claim 11, wherein retrieving the local content from the database further based on a type of the video.

15. The method of claim 11 further comprising:
obtaining social media website data from a social media website based on the first command; and
modifying the modified video using the social media website data before transmitting the modified video to the display.

16. The method of claim 11, wherein the local content includes emergency information, and wherein modifying the video to generate the modified video comprises overlaying the emergency information on the video.

17. The method of claim 11, wherein the local content includes news, and wherein modifying the video to generate the modified video comprises overlaying the news on the video.

18. The method of claim 11, wherein the plurality of commands are inserted into the video in real-time while streaming the video using the IP-based stream.

19. The method of claim 11, wherein the content providing network is a television network.

20. The method of claim 11, wherein the second command is used to make a call to the database to retrieve the local content from the database.

* * * * *